United States Patent

Hatakeyama et al.

[11] Patent Number: 5,897,703
[45] Date of Patent: *Apr. 27, 1999

[54] HARDENING COMPOSITION, HARDENED PRODUCT, AND METHOD OF PRODUCING HARDENED PRODUCT

[75] Inventors: Yuji Hatakeyama; Hiroshi Inoue, both of Kanagawa-ken; Katsuhiko Yamamoto, Chiba-ken, all of Japan

[73] Assignee: Tokyo Chemical Co., Ltd, Kamakura, Japan

[*] Notice: This patent is subject to a terminal disclaimer.

[21] Appl. No.: 08/904,976

[22] Filed: Aug. 1, 1997

Related U.S. Application Data

[63] Continuation-in-part of application No. 08/544,315, Oct. 17, 1995, Pat. No. 5,669,968, which is a continuation of application No. 08/322,685, Oct. 13, 1994, abandoned.

[30] Foreign Application Priority Data

Oct. 29, 1993 [JP] Japan .................................. 5-272511

[51] Int. Cl.$^6$ ...................................................... C04B 9/00
[52] U.S. Cl. ......................... 106/696; 106/801; 106/802
[58] Field of Search ................................. 106/696, 801, 106/802

[56] References Cited

U.S. PATENT DOCUMENTS 5,669,968  9/1997  Kobori et al. ........................ 106/696

FOREIGN PATENT DOCUMENTS 54-161611  12/1979  Japan .
57-195787  12/1982  Japan .
59-207869  11/1984  Japan .

*Primary Examiner*—Paul Marcantoni
*Attorney, Agent, or Firm*—Darby & Darby

[57] ABSTRACT

A hardening composition comprising a hardening component and hardening agents, said hardening component consisting essentially of magnesium oxide, said hardening agents consisting essentially of propylene carbonate and water, content of said magnesium oxide being 100 parts by weight, content of said propylene carbonate being 1 to 60 parts by weight, and content of said water being 20 to 135 parts by weight. Further disclosed are a hardened product prepared by hardening the hardening composition, and a method for producing the hardened product.

18 Claims, No Drawings

HARDENING COMPOSITION, HARDENED PRODUCT, AND METHOD OF PRODUCING HARDENED PRODUCT

CROSS-REFERENCE TO RELATED APPLICATION

This is a continuation-in-part application of U.S. patent application Ser. No. 08/544,315 filed Oct. 17, 1995, now pending, which in turn is a continuation application of U.S. patent application Ser. No. 08/322,685 filed Oct. 13, 1994, now abandoned.

BACKGROUND OF THE INVENTION

This invention relates to a hardening composition for civil engineering and construction works, more specifically, to a hardening composition which gives a hardened product having high compressive strength and high bending strength, and such hardened product, and a method for producing such hardened product.

There has hitherto been known an inorganic hardening composition which contains an alkali metal silicate as a requisite hardening component, often referred to as water glass, and a hardening agent therefor. For example, Japanese Laid-open Patent Application No. 57-198782 discloses a method for stabilizing soil using a mixture of (A) an aqueous solution of sodium silicate and (B) a mixed aqueous solution of sodium hydrogensulfate and potassium chloride; or an aqueous solution of a mixture of the mixed aqueous solution and (a) magnesium oxide and/or magnesium hydroxide, and/or (b) at least one member selected from the group consisting of sodium dihydrogenphosphate, potassium dihydrogenphosphate, disodium hydrogenphosphate, dipotassium hydrogenphosphate, aluminum sulfate, magnesium sulfate, magnesium chloride, and potassium alum, with an addition of ethylene carbonate and/or propylene carbonate to the solution (B). The solutions (A) and (B) are mixed and hardened in the soil for stabilization. Further, U.S. Pat. No. 4,363,665 to Barrier et al. discloses a moldable composition of matter comprising an admixture of (1) sand, (2) an alkali metal silicate, (3) a hardening agent comprising an alkylene carbonate, carboxylic acid ester, or mixtures thereof, and (4) a demolding agent including a mixture of alkaline earth metal oxide or carbonate and a hydrate alumina. U.S. Pat. No. 4,683,019 to Motoki discloses a self-hardening refractory composition for coating on a steel column or steel beam, comprising at least one water-soluble alkali silicate, a hardener for the water-soluble alkali silicate such as bivalent or higher valent metal salts of higher fatty acids, and at least one material selected from the group consisting of a material containing bound water and a material capable of absorbing heat when heated.

On the other hand, there has hitherto been proposed a hardening composition which does not contain water glass as a requisite hardening component. This hardening composition has a totally different composition from that of the inorganic hardening composition as mentioned above. For example, compositions are known containing as the hardening component an alkaline earth metal hydroxide or an alkaline earth metal oxide. However, a type and mixing amount of a hardening agent for these hardening components vary depending on the type of the alkaline earth metal hydroxide or the alkaline earth metal oxide. Therefore, there has hardly been obtained a hardened product hardened within a practical hardening time and having a sufficient strength comparable to or higher than that of a hardened product containing water glass as the hardening component. In this regard, there has been proposed in U.S. Pat. No. 5,036,029 to Johnson to use an organic binder such as a urea-formaldehyde resin in addition to the hardening agent such as water, thereby reinforcing the binding force between the hardening components. However, studies have not been made on selection of the hardening agent itself.

SUMMARY OF THE INVENTION

It is therefore an object of the present invention to provide a hardening composition which does not contain water glass as a hardening component, which is hardened within a practical hardening time period, and which gives a hardened product having high compressive strength and high bending strength.

It is another object of the present invention to provide a hardened product which does not contain water glass and which has high compressive strength and high bending strength.

It is another object of the present invention to provide a method for producing a hardened product without a sintering process, which does not contain water glass as a hardening component, and which has high compressive strength and high bending strength.

The above and other objects of the present invention will become apparent from the following description.

According to the present invention, there is provided a hardening composition comprising a hardening component and hardening agents, said hardening component consisting essentially of magnesium oxide, said hardening agents consisting essentially of propylene carbonate and water, content of said magnesium oxide being 100 parts by weight, content of said propylene carbonate being 1 to 60 parts by weight, and content of said water being 20 to 135 parts by weight.

According to the present invention, there is also provided a hardened product prepared by hardening a hardening composition comprising a hardening component and hardening agents, said hardening component consisting essentially of magnesium oxide, said hardening agents consisting essentially of propylene carbonate and water, content of said magnesium oxide being 100 parts by weight, content of said propylene carbonate being 1 to 60 parts by weight, and content of said water being 20 to 135 parts by weight.

According to the present invention, there is further provided a method for producing a hardened product comprising the steps of kneading a hardening composition comprising a hardening component and hardening agents, said hardening component consisting essentially of magnesium oxide, said hardening agents consisting essentially of propylene carbonate and water, content of said magnesium oxide being 100parts by weight, content of said propylene carbonate being 1 to 60 parts by weight, and content of said water being 20 to 135 parts by weight; and hardening the kneaded composition without sintering.

PREFERRED EMBODIMENTS OF THE INVENTION

The present invention will be further explained in detail hereinbelow.

The hardening composition of the present invention includes magnesium oxide (MgO) as a hardening component, and particular amounts of propylene carbonate and water as hardening agents. The term hardening component herein refers to a component to be hardened, whereas the term hardening agent refers to a component to harden the hardening component. The hardening composition of the present invention may optionally contain, for example, aggregates, reinforcement fibers, or pigments, in addition to the components mentioned above. In particular, the hardening composition may preferably contain aggregates.

The magnesium oxide as the hardening component may be soft-burned, that is burned lightly so as to have a low bulk density, or hard-burned, that is burned heavily so as to have a high bulk density. It is preferred to use a mixture of soft-burned and hard-burned magnesium oxides. Further, the magnesium oxide may inevitably contain minor amounts of natural mineral components, for example, metal oxides such as $Fe_2O_3$, $Al_2O_3$, $SiO_2$, $TiO_2$, $Na_2O$, or $K_2O$; carbonates such as $MgCO_3$, $CaCO_3$, $SrCO_3$, or $BaCO_3$; or hydroxides such as $Mg(OH)_2$ or $Ca(OH)_2$, depending on the preparation process of the magnesium oxide, as long as the effects of the present invention can be achieved.

Magnesium oxide is used usually in the form of powders. The particle size of the MgO powders is not particularly limited, but the mean particle size of 1 to 500 $\mu$m is preferred.

Propylene carbonate used as the hardening agent is in the form of liquid. The mixing ratio of propylene carbonate is 1 to 60 parts by weight; preferably not less than 1 and less than 5 parts by weight, or 5 to 40 parts by weight; more preferably not less than 1 and less than 5 parts by weight, or 5 to 20 parts by weight, based on 100 parts by weight of magnesium oxide. When the hardening composition of the present invention contains aggregates as will be described later, the mixing ratio of propylene carbonate in the range of 40 to 60 parts by weight may also give preferable strength to the resulting hardened product. If the mixing ratio of propylene carbonate is outside the range of 1 to 60 parts by weight, sufficient strength or uniform compositional distribution cannot be rendered to the resulting hardened product.

Water as the hardening agent is admixed in an amount of 20 to 135 parts by weight based on 100 parts by weight of magnesium oxide. If the mixing ratio of water is outside this range, sufficient strength or uniform compositional distribution cannot be rendered to the resulting hardened product.

The hardening composition of the present invention may optionally contain aggregates. Examples of the aggregates may include, for example, ordinary aggregates, such as silica sand, silica powders, pulverized natural stones including lime stone, granite, andesite, and marble, or blast furnace slag; or light-weight aggregates such as Shirasu balloons, glass balloons, or sintered products of expansive clay, expanded shale, vermiculite, obsidian, or pearlite. These may be used alone or as a mixture, depending on the purpose. The hardening composition of the present invention may also optionally contain reinforcement fibers such as glass fibers, metal fibers, or organic fibers. The particle size of the aggregates and the length of the reinforcement fibers may suitably be selected as long as the desired effect of the present invention can be achieved. The mixing ratio of the aggregates, if any, is preferably 30 to 400 parts by weight based on 100 parts by weight of magnesium oxide. If the mixing ratio of the aggregates is less than 30 parts by weight, effect of admixing the aggregates to lower the material cost cannot be achieved sufficiently. If the mixing ratio of the aggregates exceeds 400 parts by weight, the strength of the resulting hardened product may be lowered, thus not being preferred. The mixing ratio of the reinforcement fibers, if any, is preferably 0.2 to 20 parts by weight based on 100 parts by weight of magnesium oxide.

The hardening composition of the present invention may further contain additives such as defoaming agent, foaming agent, and other chemical mixing agents for cement, in addition to the above components. The mixing ratio of such additives may usually be 0.01 to 30 parts by weight based on 100 parts by weight of magnesium oxide.

The hardened product of the present invention has the compressive strength (JIS R 5201) of preferably 150 kgf/$cm^2$ or higher, more preferably 200 kgf/$cm^2$ or higher, most preferably 300 kgf/$cm^2$ or higher, and the bending strength (JIS R 5201) of 40 kgf/$cm^2$ or higher, more preferably 50 kgf/$cm^2$ or higher, when the hardened product is prepared, for example, by molding the hardening composition in a mold frame of 4×4×16 cm in size, followed by curing for 28 days, though the above values may vary depending on the shape and size of the product as well as the curing time.

According to the present invention, the hardened product may be prepared by kneading the hardening composition and hardening the kneaded composition without sintering.

The kneading of the hardening composition may be carried out by any of a method of kneading all of the hardening component and the hardening agents, and optionally aggregates together; a method of adding a mixture of the hardening agents to the hardening component and kneading; or a method of emulsifying all of propylene carbonate and a portion of water as the hardening agents in advance, and kneading the obtained emulsion, remaining portion of water, and the hardening component together. Through such kneading, the hardening composition usually takes the form of slurry.

For hardening the slurry of the hardening composition, the slurry may be molded by any of cast molding, press molding, extrusion molding or spraying method, and after setting, may be hardened without sintering, for example, by curing at a room temperature, or curing under heating under wet conditions such as steam curing, taking into account the dimension and the physical properties of the hardened product and the production efficiency. No sintering is performed. Through these process, practical strength may be achieved in about one day after the placement.

For molding, moderate handling time is desired. For controlling the handling time, a setting retarder or a setting accelerator may be added to the hardening composition, the hardening agent, or the slurry of the hardening composition. Examples of the setting retarder may include boric acid, salts thereof, oxycarboxylic acid, salts thereof, ethylene diamine tetraacetate (EDTA), salts thereof, polyhydric alcohols, salts thereof, silicofluorides, or mixtures thereof. Examples of the setting accelerator may include $Na_2CO_3$, $K_2CO_3$, NaCl, KCl, $MgCl_2$, $CaCl_2$, sodium aluminate, alum, or mixtures thereof.

The mixing ratio of the setting retarder or the setting accelerator is preferably 0.5 to 30 parts by weight, respectively, based on 100 parts by weight of magnesium oxide.

Incidentally, MgO including both the soft-burned and hard-burned products manufactured by NIHON KAISUIKAKO CORPORATION and propylene carbonate manufactured by TOA GOSEI CHEMICAL INDUSTRY CO., LTD. were employed.

TABLE 1

|  | Hardening Components | | Hardening Agents | | Bending | Compressive |
|---|---|---|---|---|---|---|
|  | Soft-burned MgO | Hard-burned MgO | Propylene Carbonate | Water | Strength (kgf/cm$^2$) | Strength (kgf/cm$^2$) |
| Example 1 | 50 | 50 | 1 | 46 | 39.5 | 233.0 |
| Comp. Ex. 1 | 33 | 67 | — | 32 | 24.5 | 110.7 |
| Comp. Ex. 2 | 50 | 50 | 0.5 | 46.5 | 23.6 | 155.3 |

Since the hardening composition of the present invention contains particular amounts of magnesium oxide as a hardening component, and propylene carbonate and water as hardening agents, the hardening composition can be hardened under practical molding conditions, and a hardened product of superior compressive strength and bending strength can be obtained. Since the hardened product of the present invention contains magnesium oxide as the hardening component, and exhibits superior compressive strength and bending strength, it is useful as a construction material such as tile, wall material, top board, ceiling board, floor material, or the like. According to the present invention, the hardened product can be obtained easily.

EXAMPLES

The present invention will be explained in more detail with reference to Examples and Comparative Examples, but the present invention is not limited thereto. Incidentally, the unit for the values of the hardening component, hardening agents, and additives in the Tables is parts by weight.

Example 1 and Comparative Examples 1 and 2

Hardening component and hardening agents shown in Table 1 were kneaded in a mortar mixer to give a slurry. Then the obtained slurry was cast into a 4×4×16 cm size mold frame on a table vibrator and molded under vibration. The molded slurry was allowed to stand for 24 hours, and then the molded product was extracted from the mold frame and cured at 20° C. for 28 days to produce a hardened product. The obtained hardened product was measured of the bending strength and the compressive strength in accordance with JIS R 5201. The results are shown in Table 1.

From the results shown in Table 1, it is understood that when the mixing ratio of propylene carbonate as the hardening agent is less than 1 parts by weight based on 100 parts by weight of magnesium oxide, the strength of the obtained hardened product is remarkably lowered.

Examples 2 to 6, and Comparative Examples 3 and 4

Using the hardening component, hardening agents, and additive shown in Table 2, a hardened product was prepared in the same way as in Example 1, and the same measurements were conducted. The results are shown in Table 2. Incidentally, as the aggregates, CaCO$_3$ manufactured by NITTO HUNKA KOGYO K. K. (trade name "KANSUI #50") was used.

TABLE 2

|  | Hardening Components | | Hardening Agents | | | Bending | Compressive |
|---|---|---|---|---|---|---|---|
|  | Soft-burned MgO | Hard-burned MgO | Propylene Carbonate | Water | Aggregates CaCO$_3$ | Strength (kgf/cm$^2$) | Strength (kgf/cm$^2$) |
| Example 2 | 33 | 67 | 2 | 30 | — | 62.6 | 361.4 |
| Example 3 | — | 100 | 5 | 20 | — | 45.1 | 227.6 |
| Example 4 | 33 | 67 | 7 | 30 | — | 78.2 | 360.1 |
| Example 5 | 100 | — | 5 | 85 | 200 | 78.1 | 298.4 |
| Example 6 | 100 | — | 5 | 135 | 400 | 41.9 | 159.8 |
| Comp. Ex. 3 | 100 | — | 20 | 10 | — | Insufficiently Hardened | |
| Comp. Ex. 4 | 100 | — | 5 | 155 | 500 | 30.1 | 129.0 |

From the results shown in Table 2, it is understood that when the mixing ratio of water is less than 20 parts by weight or more than 135 parts by weight based on 100 parts by weight of magnesium oxide, the strength of the obtained hardened product is remarkably lowered.

Examples 7 and 8, and Comparative Examples 5 to 10

Using the hardening component and hardening agents shown in Table 3, a hardened product was prepared in the same way as in Example 1, and the same measurements were conducted. The results are shown in Table 3. Incidentally, as sodium silicate, disodium trisilicate (according to JIS K1408-1966; Na$_2$O.3SiO$_2$.aq) manufactured by NIPPON CHEMICAL INDUSTRIAL, CO., LTD. was used.

TABLE 3

| | Hardening Components | | | Hardening Agents | | Bending | Compressive |
|---|---|---|---|---|---|---|---|
| | Soft-burned MgO | Hard-burned MgO | Sodium Silicate | Propylene Carbonate | Water | Strength (kgf/cm$^2$) | Strength (kgf/cm$^2$) |
| Example 7 | 33 | 67 | — | 5 | 30 | 64.9 | 500.8 |
| Comp. Ex. 5 | 33 | 67 | 10 | 5 | 30 | 16.2 | 177.9 |
| Comp. Ex. 6 | 33 | 67 | 20 | 5 | 30 | 13.7 | 154.3 |
| Comp. Ex. 7 | 33 | 67 | 30 | 5 | 30 | 23.3 | 74.3 |
| Example 8 | 50 | 50 | — | 20 | 35 | 46.2 | 296.1 |
| Comp. Ex. 8 | 50 | 50 | 10 | 20 | 35 | 32.1 | 243.5 |
| Comp. Ex. 9 | 50 | 50 | 20 | 20 | 35 | 39.7 | 212.7 |
| Comp. Ex. 10 | 50 | 50 | 30 | 20 | 35 | 24.0 | 190.8 |

From the results shown in Table 3, it is understood that the hardened product obtained from the hardening composition of the present invention has remarkably superior strength to a hardened product containing sodium silicate as water glass conventionally used in an inorganic hardening composition as the hardening component.

Example 9

76.9% by weight of propylene carbonate, 7.7% by weight of propylene glycol, 7.7% by weight of nonionic surface active agent (trade name "ADEKATOL NP-760" manufactured by ASAHI DENKA KOGYO, K. K.), and 7.7% by weight of water were mixed to produce an emulsion. With a hardening composition containing 7 parts by weight of the emulsion thus obtained, 93 parts by weight of water, and 100 parts by weight of magnesium oxide (90 parts by weight of soft-burned MgO and 10 parts by weight of hard-burned MgO) as the hardening component, i.e. containing 5 parts by weight of propylene carbonate and 93.5 parts by weight of water based on 100 parts by weight of magnesium oxide, a hardened product was prepared in the same way as in Example 1, and the same measurements were conducted. As a result, it was revealed that the bending strength of the hardened product was 50.3 kgf/cm$^2$, and the compressive strength was 201.1 kgf/cm$^2$.

Example 10

With a hardening composition containing 26 parts by weight of the emulsion prepared in Example 9, 74 parts by weight of water, and 100 parts by weight of magnesium oxide (85 parts by weight of soft-burned MgO and 15 parts by weight of hard-burned MgO) as the hardening component, i.e. containing 20 parts by weight of propylene carbonate and 76 parts by weight of water based on 100 parts by weight of magnesium oxide, a hardened product was prepared in the same way as in Example 1, and the same measurements were conducted. As a result, it was revealed that the bending strength of the hardened product was 53.8 kgf/cm , and the compressive strength was 192.1 kgf/cm$^2$.

Examples 11 to 15 and Comparative Example 11

Using the hardening component, hardening agents, and and additive shown in Table 4, a hardened product was prepared in the same way as in Example 1, and the same measurements were conducted. The results are shown in Table 4. Incidentally, the aggregates used here were the same as those used in Example 5.

TABLE 4

| | Hardening Components | | Hardening Agents | | | Bending | Compressive |
|---|---|---|---|---|---|---|---|
| | Soft-burned MgO | Hard-burned MgO | Propylene Carbonate | Water | Aggregates CaCO$_3$ | Strength (kgf/cm$^2$) | Strength (kgf/cm$^2$) |
| Example 11 | — | 100 | 5 | 27 | 30 | 44.4 | 197.8 |
| Example 12 | 100 | — | 5 | 80 | 100 | 73.4 | 252.3 |
| Example 13 | 100 | — | 5 | 85 | 200 | 78.1 | 298.4 |
| Example 14 | 100 | — | 5 | 120 | 300 | 47.9 | 158.3 |
| Example 15 | 100 | — | 5 | 135 | 400 | 41.9 | 159.8 |
| Comp. Ex. 11 | 100 | — | 5 | 155 | 500 | 30.1 | 129.0 |

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A hardening composition comprising a hardening component and hardening agents, said hardening component consisting essentially of magnesium oxide, said hardening agents consisting essentially of propylene carbonate and water, content of said magnesium oxide being 100 parts by weight, content of said propylene carbonate being 1 to 60 parts by weight, and content of said water being 20 to 135 parts by weight.

2. The hardening composition as claimed in claim 1 wherein content of said propylene carbonate is not less than 1 and less than 5 parts by weight.

3. The hardening composition as claimed in claim 1 wherein content of said propylene carbonate is not less than 5 and not more than 60 parts by weight.

4. The hardening composition as claimed in claim 1 wherein said magnesium oxide inevitably includes a minor amount of natural mineral component selected from the group consisting of $Fe_2O_3$, $Al_2O_3$, $SiO_2$, $TiO_2$, $Na_2O$, $K_2O$, $MgCO_3$, $CaCO_3$, $SrCO_3$, $BaCO_3$, $Mg(OH)_2$, $Ca(OH)_2$, and mixtures thereof.

5. The hardening composition as claimed in claim 1 wherein said hardening composition consists essentially of said hardening component and said hardening agents.

6. The hardening composition as claimed in claim 1 further comprising aggregates.

7. The hardening composition as claimed in claim 6 wherein said aggregates are selected from the group consisting of silica sand, silica powders, lime stone, granite, andesite, marble, blast furnace slag, Shirasu balloons, glass balloons, sintered expansive clay, sintered expanded shale, sintered vermiculite, sintered obsidian, sintered pearlite, and mixtures thereof.

8. The hardening composition as claimed in claim 6 wherein content of said aggregates is 30 to 400 parts by weight based on 100 parts by weight of magnesium oxide.

9. The hardening composition as claimed in claim 6 wherein content of said propylene carbonate is 40 to 60 parts by weight based on 100 parts by weight of magnesium oxide.

10. The hardening composition as claimed in claim 1 further comprising an additive selected from the group consisting of reinforcement fibers, pigments, and mixtures thereof.

11. The hardening composition as claimed in claim 10 wherein said reinforcement fibers are selected from the group consisting of glass fibers, metal fibers, organic fibers, and mixtures thereof.

12. The hardening composition as claimed in claim 1 further comprising an additive selected from the group consisting of a setting retarder, a setting accelerator, a deforming agent, a foaming agent, a chemical mixing agent for cement, and mixtures thereof.

13. A hardened product prepared by hardening a hardening composition comprising a hardening component and hardening agents, said hardening component consisting essentially of magnesium oxide, said hardening agents consisting essentially of propylene carbonate and water, content of said magnesium oxide being 100 parts by weight, content of said propylene carbonate being 1 to 60 parts by weight, and content of said water being 20 to 135 parts by weight.

14. The hardened product as claimed in claim 13 wherein said hardening composition further comprising aggregates.

15. The hardened product as claimed in claim 14 wherein content of said aggregates is 30 to 400 parts by weight based on 100 parts by weight of magnesium oxide.

16. A method for producing a hardened product comprising the steps of kneading a hardening composition comprising a hardening component and hardening agents, said hardening component consisting essentially of magnesium oxide, said hardening agents consisting essentially of propylene carbonate and water, content of said magnesium oxide being 100 parts by weight, content of said propylene carbonate being 1 to 60 parts by weight, and content of said water being 20 to 135 parts by weight, and hardening the kneaded composition without sintering.

17. The method as claimed in claim 16 wherein said hardening composition further contains aggregates.

18. The method as claimed in claim 16 wherein said hardening step without sintering is a step selected from the group consisting of allowing the kneaded composition to stand, and curing the kneaded composition under heating under wet conditions.

* * * * *

UNITED STATES PATENT AND TRADEMARK OFFICE
CERTIFICATE OF CORRECTION

PATENT NO. : 5,897,703
DATED : April 27, 1999
INVENTOR(S) : Yuji HATAKEYAMA

It is certified that error appears in the above-identified patent and that said Letters Patent is hereby corrected as shown below:

On the title page item:
    [73] Assignee, change "TOKYO" to --TOYO--.

Signed and Sealed this

Ninth Day of November, 1999

Attest:

Q. TODD DICKINSON

Attesting Officer     Acting Commissioner of Patents and Trademarks